United States Patent

Kohn et al.

Patent Number: 5,109,740
Date of Patent: May 5, 1992

[54] BILLET CUT-OFF CONTROL

[75] Inventors: Michael T. Kohn, Belding; John F. Pearson, Grand Rapids, both of Mich.

[73] Assignee: Belco Industries, Inc., Belding, Mich.

[21] Appl. No.: 616,341

[22] Filed: Nov. 21, 1990

[51] Int. Cl.⁵ ............................................... B23D 33/02
[52] U.S. Cl. .......................................... 83/15; 83/170; 83/364; 83/365; 83/371
[58] Field of Search .................... 83/15, 170, 364, 365, 83/371

[56] References Cited

U.S. PATENT DOCUMENTS

| | | | |
|---|---|---|---|
| 3,020,788 | 2/1962 | Peters | 80/35 |
| 3,128,818 | 4/1964 | Bottom | 153/2 |
| 3,148,563 | 9/1964 | Harley et al. | 80/3 |
| 3,223,345 | 12/1965 | Hill | 242/80 |
| 3,267,711 | 8/1966 | Anderson | 72/254 |
| 3,552,163 | 1/1971 | Lloyd | 72/14 |
| 3,592,029 | 7/1971 | Ritter et al. | 72/7 |
| 3,955,389 | 5/1976 | Foster | 72/9 |
| 3,972,211 | 8/1976 | Linthicom et al. | 72/14 |
| 4,526,073 | 7/1985 | Elhaus | 83/15 |
| 4,559,854 | 12/1985 | Jürgens | 83/15 X |
| 4,651,602 | 3/1987 | Harrold et al. | 83/15 |
| 4,787,281 | 11/1988 | Gardner | 83/15 |
| 4,944,206 | 7/1990 | Guy et al. | 83/370 |
| 5,031,493 | 7/1991 | Dorr | 83/370 |

*Primary Examiner*—Frank T. Yost
*Assistant Examiner*—Ken Peterson
*Attorney, Agent, or Firm*—Waters & Morse

[57] ABSTRACT

Metal billets are cut from heated logs emerging from a furnace by a shearing system controlled by information detected as the logs emerge from the furnace. Detection in this position eliminates the variations inherently present in the length of the logs resulting from temperature gradients within the furnace, and from a length of time the logs are subject to these gradients. The advancing end of an isolated log is sensed by an electric eye, and the interface between one log and the following log is detected by an eddy current device. The data from these sensing devices is supplied to a computer, which controls the shearing operation so that billets can be cut with a minimum of waste. The billets can be of two segments, and the equipment establishes cutting operations that produce the combined billet length, regardless of the position of the interface between the logs.

1 Claim, 2 Drawing Sheets

BILLET CUT-OFF CONTROL

BACKGROUND OF THE INVENTION

The extrusion of aluminum is usually preceded by heating a piece, referred to as a "billet", to the point that it is sufficiently plastic to be squeezed through an extrusion die. The die will have an opening defining the cross-section of the extruded piece. These billets are cut from elongated cast "logs", which are cylindrical, and commonly from six to ten inches in diameter. These are perhaps initially twenty feet long. One approach to supplying the heated billets is to heat the entire log, and cut off the billets as needed as they emerge from a furnace. Furnaces and cut-off equipment for performing this function have been available for some time. The long "tunnel" furnaces vary somewhat in detailed design, but usually have a conveyor system carrying the logs into one end and through the furnace, and out to the station where the hot billet is sheared from the log. A set of gas burners is usually the heat source, and these are mounted near the discharge end of the furnace. The products of combustion move toward the entrance end, causing this section of the furnace to form a pre-heat zone.

The billet supplied to the extruder does not need to be in one piece, since it will be merely a non-defined mass of plastic material in the extrusion process. The length of the billet is determined by the quantity of material required for the particular extrusion operation, and the diameter of the log. A particular extrusion operation may require billets twenty four inches long at the available log diameter. This length can be made up of one segment fourteen inches long, and another ten inches long. When the trailing end of the log approaches the shearing station, either an operator or automatic equipment must cause the system to make up segments of the required length, making allowance for the fact that the segments have a minimum length determined by the characteristics of the conveying and cut-off systems.

The standard approach to controlling the cut-off system is via a control of the incremental conveyor, or "pusher", that moves the logs through the furnace. This, in turn, has been through sensing equipment located at the entrance end of the furnace, and which records the position of the beginning of the log and of each incremental movement through the furnace. If the log were of a constant length (minus the length of pieces cut off), this control system would be adequate. However, there is a significant temperature gradient along the furnace, and the logs may remain in one section of the furnace for varying periods of time. They may remain at the hotter outlet end for an extended period, for example, as the needs of the extruders supplied by the furnace vary for one reason or another. The uncut length of a log may easily vary a couple of inches during its passage through the furnace, which would be enough to throw off the billet lengths selected for best extrusion operation. The problem is inherent in a system controlled by sensing equipment at the entrance end of the furnace.

SUMMARY OF THE INVENTION

The present invention provides a method of controlling the cut-off operation as a function of conditions sensed at the exit end of the furnace, and between that position and the plane of the shearing operation. These conditions are sensed as the logs are moving into the shearing station. The pusher records the amount of the advance of the log from the preceding shear. Non-contacting sensing devices record the passage of the end of one log and the beginning of the next. This is preferably detected by an eddy current device, and the beginning of an isolated log (with no log preceding it) is preferably also detected by an electric eye. The eddy-current detector responds to the discontinuity in the abutting ends of the logs, which is sensed in the same manner that cracks can be sensed in structural members. This is important, as there is usually little or no gap between the abutting ends of logs, due to the action of the pusher of the conveyer system. Information derived from this sensing equipment is fed into a conventional computer, which is programmed to operate the shearing system as a function of this data.

DESCRIPTION OF THE REFERRED METHOD

Figure 1:
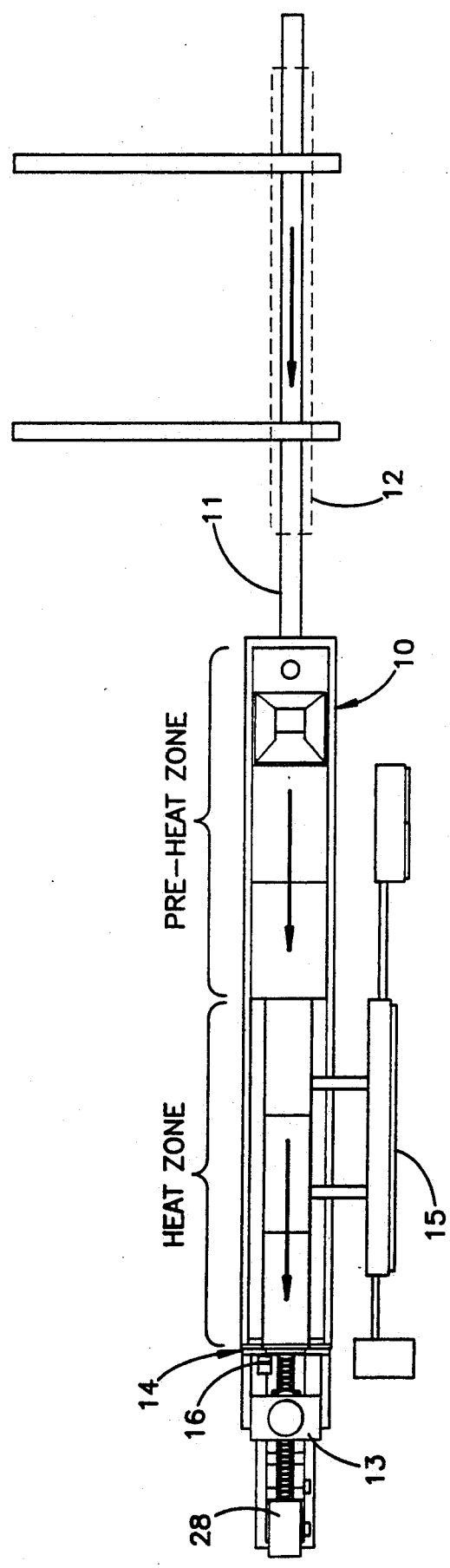
FIG. 1 is a schematic illustration showing the general layout of a conventional furnace and shear system, and illustrating the position of the detecting system provided by this invention.

In FIG. 1, the tunnel furnace generally indicated at 10 is usually equipped with a pusher conveyor 11 that takes logs in the position shown at 12 in dotted lines, and advances them into and through the furnace. The logs will pass through the pre-heat zone and the heating zone, in sequence, where they emerge from the end of the furnace at a temperature suitable for the operation of an extrusion machine. A hydraulic shearing device 13 is spaced from the exit end 14 of the furnace, and receives the logs moving down the conveyor 11 as they emerge in the heated condition. The heat is supplied by burners located in the heat zone fed by the manifold and controls generally indicated at 15. The furnace structure thus far described is conventional.

Detection devices indicated at 16 are positioned between the end of the furnace and the shearing device 13. This detection system includes the electric eye unit 17 and the eddy-current detector 18. Both of these are mounted at one side of the path of the logs emerging from the furnace. The electric eye may respond directly to a light beam, or from a mirror mounted at the opposite side of the log path. In either case, the light beam must be positioned to be intersected by the moving logs. The eddy current detector 18 is of standard design, and is usually equipped with a toroidal probe that is positioned half and inch to an inch from the position of the side of the moving logs. These units generate a toroidal electro-magnetic field, producing eddy currents in the material moving adjacent the end of the probe. Variations in the condition of the field are detected by the instrument, and these field conditions will vary according to whether or not metal passing in front of the probe is continuous or discontinuous. Such instruments have been developed to a high degree of accuracy for the detection of cracks in structural materials. In the present application, this principle is employed to detect the presence of a plane of discontinuity between one log and the log that is pressed against it by the pusher system. A device of this type that appears to perform well in this equipment is being marketed by FaAA Products Corporation under the trademark SMART EDDY. The detection system includes the probe and a computer programmed to suit the needs of the particular installation. This company is located at 149 Commonwealth Drive, in Menlo Park, Calif.

Figure 3:
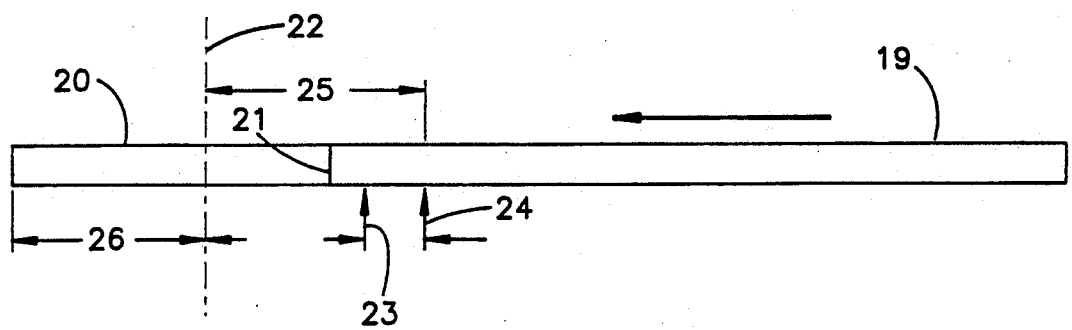
FIGS. 3 and 4 are schematic illustrations showing the conditions in the heated log which are detected by the system, and which are referred to in order to cut billets with a minimum of waste.

In FIG. 3, a schematic relationship is illustrated between a log 19 moving through the furnace, and what remains of a preceding log 20 passing through the shearing station. The interface 21 represents the trailing end of the log 20 and the leading end of the log 19. The plane of operation of the shearing device 13 is indicated at 22, and the position of the eddy-current detector at 23. The electric eye position is shown at 24, both of these devices being within the space 25 between the end of the furnace and the shear plane 22. With the position of the interface 21 shown in FIG. 3, the shearing device can cut off a billet of the required length 26, followed by the advancement of the logs 19 and 20 after the shear has retracted. The eddy current detector has already recorded the passage of the interface 21 as the logs had been moved into the FIG. 3 position. The logs can then be advanced the normal billet length, where the shear will cut at a point which will include a piece from the end of the log 19. If this piece exceeds the minimum length that the conveying systems and the shear can handle, this combined billet consisting of two components is handled in approximately the same way as a solid billet.

Figure 2:
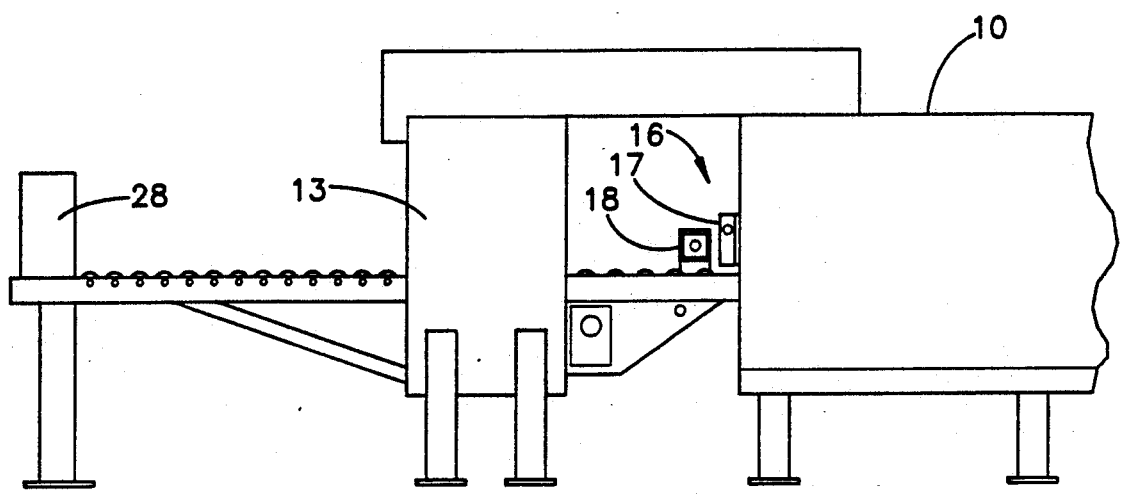
FIG. 2 is a schematic view in elevation of that portion of FIG. 1 containing the shear system and the detection equipment.
Figure 4:
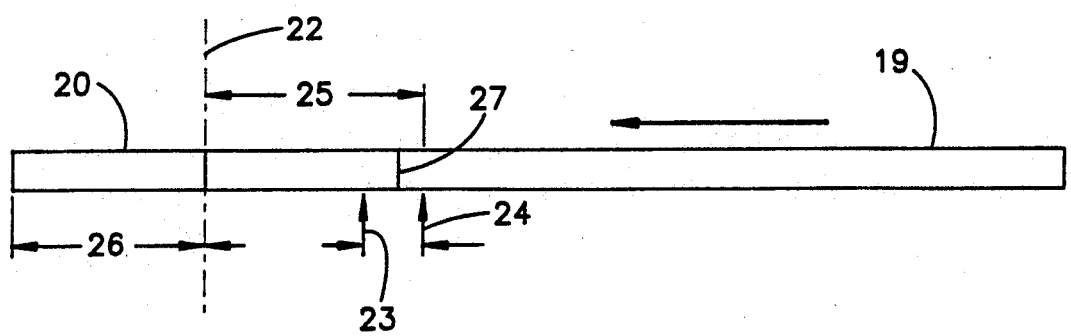

FIG. 4 represents a different condition which must be accommodated by the control system. The operation of the shear to cut off the billet length 26 from the log 20 is followed (after retraction of the shear) by the advancement of the logs. During this advance, the interface 27 will pass the eddy current detection station 23, which will establish that the cutting of a solid piece from a log 20 would leave too short a piece to be handled effectively by the conveying and shearing system. This information will cause the program of the computer to advance the logs perhaps half the usual billet length. The log 20 is sheared at this point. This piece is pushed on into the storage station shown schematically at 28 in FIGS. 1 and 2, where it is kept hot until a matching piece can be provided. The logs 19 and 20 are then advanced one billet length, where a cut is made producing a sufficient added length from the log 19 which (when added to the remaining piece from the log 20) will produce a billet of the required length. Another piece is then cut from the log 19 which, when added to the piece now in storage, will produce a billet of the required length. These are then handled together as a new billet. The beginning of an isolated log (which was not preceded by another log) has been previously detected by the electric eye, with this information fed into the computer for establishment of this reference position. The computer is also properly programmed to push the logs back into the furnace after the shearing operation to maintain the temperature until another billet is called for. The next advance of the log end out of the furnace is detected by the electric eye.

Experience has shown that the placement of the eddy current detector 23 should be at a distance ahead of the shearing plane by an amount corresponding to one billet length plus one billet diameter, all divided by two. A minimum distance resulting from this expression is preferably held to approximately twenty inches. The computer device used with this detection system is not shown, and is standard. It is programmed to fit the particular installation. This equipment is capable of producing billet lengths to a tolerance of zero to plus one-eighth of an inch, which is well beyond the capacity of conventional systems.

We claim:

1. A method of controlling a cutting system adapted to cut from a metal log, emerging from a furnace having an outlet end, billets of one or more segments having a predetermined total length, each of said segments having a predetermined minimum length, said method comprising:

presenting an end-for-end sequence of metal logs to said cutting system at a position spaced from said furnace end on a conveyor establishing a path of log movement, each of said logs having a leading and a trailing end;

detecting at a position interposed between said furnace end and said cutting system, the discontinuity represented by a trailing end of one of said logs and a leading end of the next following log, said one and next logs remaining in end-to-end contact;

detecting a leading end of a log isolated from any preceding log; and controlling said cutting system and advancing said logs as a function of the positions of said discontinuity and leading end, said leading end detection being disposed at a distance from said discontinuity detection less than one log diameter.

* * * * *